United States Patent [19]

Chester et al.

[11] Patent Number: 4,614,578
[45] Date of Patent: * Sep. 30, 1986

[54] OCTANE AND TOTAL YIELD IMPROVEMENT IN CATALYTIC CRACKING

[75] Inventors: Arthur W. Chester, Cherry Hill; William E. Cormier, Jr., Clarksboro; William A. Stover, Woodbury, all of N.J.

[73] Assignee: Mobil Oil Corporation, New York, N.Y.

[*] Notice: The portion of the term of this patent subsequent to Jan. 5, 1999 has been disclaimed.

[21] Appl. No.: 747,698

[22] Filed: Jun. 24, 1985

Related U.S. Application Data

[63] Continuation of Ser. No. 430,198, Sep. 30, 1982, abandoned, which is a continuation of Ser. No. 301,851, Sep. 14, 1981, Pat. No. 4,368,114, which is a continuation-in-part of Ser. No. 100,585, Dec. 5, 1979, Pat. No. 4,309,279, which is a continuation-in-part of Ser. No. 50,588, Jun. 21, 1979, abandoned.

[51] Int. Cl.[4] ............................................. C10G 11/05
[52] U.S. Cl. ...................................... 208/120; 208/113
[58] Field of Search ................................. 208/120, 113

[56] References Cited

U.S. PATENT DOCUMENTS

| | | | |
|---|---|---|---|
| 3,649,521 | 3/1972 | Martin | 208/120 |
| 3,748,251 | 7/1973 | Demmel et al. | 208/74 |
| 3,770,615 | 11/1973 | Blazek | 208/120 |
| 3,779,898 | 12/1973 | Youngblood | 208/120 |
| 3,803,024 | 4/1974 | Haunschild | 208/76 |
| 3,812,029 | 5/1974 | Snyder | 208/113 |
| 4,287,048 | 9/1981 | Gladrow et al. | 208/120 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,340,465 | 7/1982 | Miller et al. | 208/120 |
| 4,368,114 | 1/1983 | Chester et al. | 208/120 |

OTHER PUBLICATIONS

Shankland & Schmitkons, "Determination of Activity and Selectivity of Cracking Catalyst" Proc. API 27 (III) 1947, pp. 57-77.

*Primary Examiner*—Curtis R. Davis
*Attorney, Agent, or Firm*—Alexander J. McKillop; Michael G. Gilman; Marina V. Schneller

[57] ABSTRACT

Octane and total yield improvement in catalytic cracking processes can be attained by the addition to conventional cracking catalysts of very small amounts of additive catalyst comprising a class of zeolites characterized by a silica to alumina mole ratio greater than about 12 and a constraint index of about 1 to 12. The additive catalyst is added to the conventional cracking catalyst in the cracking process in an amount which provides the zeolite component of the additive catalyst at from about 0.01 weight percent to about 1.0 weight percent of the conventional cracking catalyst in the cracking process.

22 Claims, 2 Drawing Figures

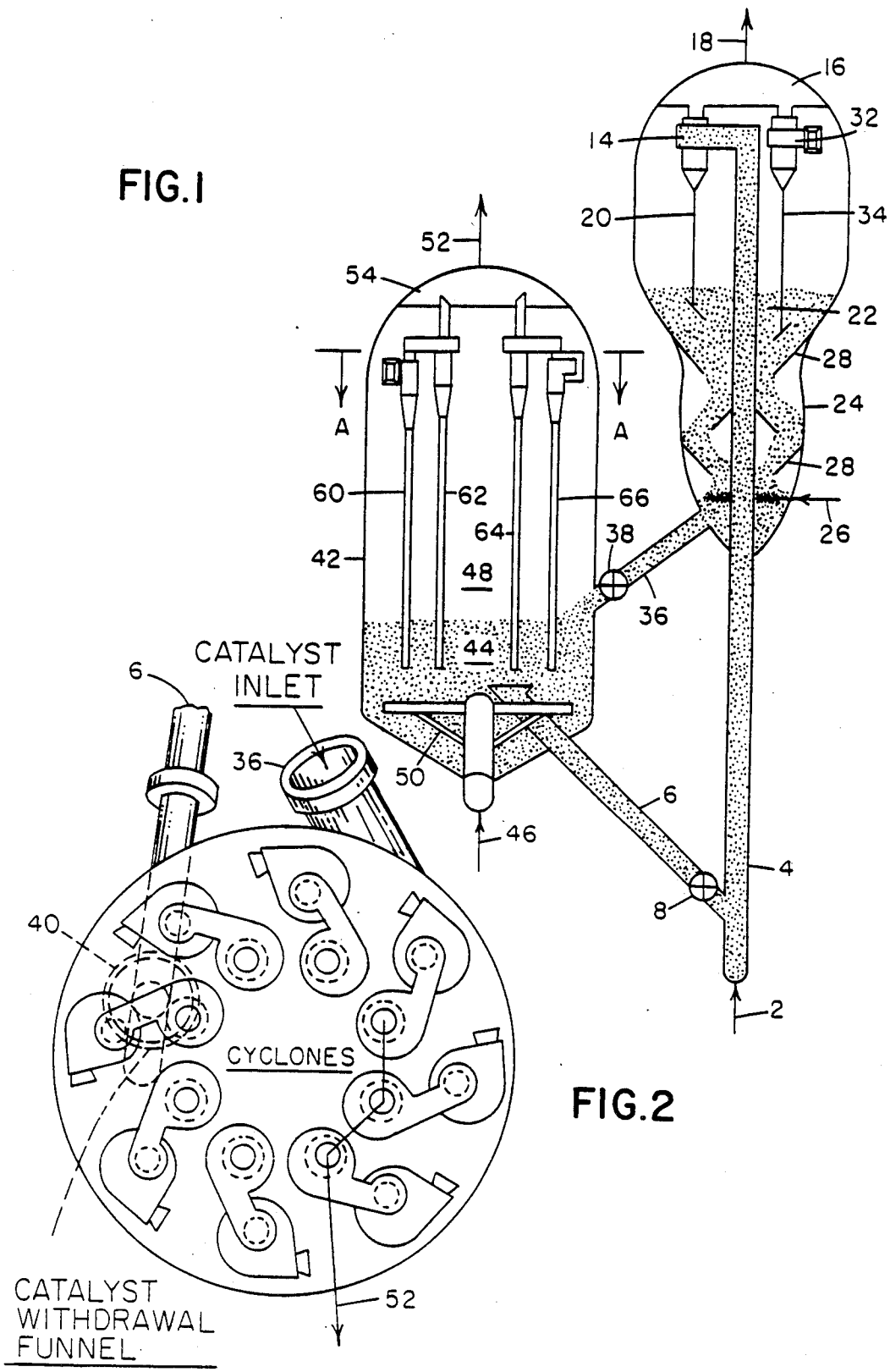

OCTANE AND TOTAL YIELD IMPROVEMENT IN CATALYTIC CRACKING

CROSS REFERENCE TO RELATED APPLICATIONS

This is a continuation of copending application Ser. No. 430,198, filed Sept. 30, 1982, now abandoned, which is a continuation of application Ser. No. 301,851, filed Sept. 14, 1981, now U.S. Pat. No. 4,368,114, which is a continuation-in-part of application Ser. No. 100,585, filed Dec. 5, 1979, now U.S. Pat. No. 4,309,279, which is a continuation-in-part of application Ser. No. 050,588, filed June 21, 1979, now abandoned. The entire contents of all these applications are incorporated herein by reference.

BACKGROUND OF THE INVENTION

1. Field of the Invention

This invention relates to an improved process to increase gasoline octane number and total yield while also increasing operational flexibility in catalytic cracking units by the addition of very small amounts of additive catalyst to conventional cracking catalysts.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a larger pore size crystalline zeolite (pore size greater than 8 Angstrom units) has indeed been very effective with respect to the raising of octane number, nevertheless it did so at the expense of the overall yield of gasoline.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite in the range of 1:10 to 3:1.

The criticality of using only miniscule amounts of additive catalyst comprising ZSM-5 class zeolite to achieve improved results with respect to octane number and overall yield has heretofore not been recognized in the art. It is the basis of the present invention that the use of only miniscule quantities of additive catalyst will give the same beneficial results that were once thought obtainable only by adding much larger quantities of ZSM-5 class catalyst.

In order to reduce automobile exhaust emissions to meet federal and state pollution requirements, many automobile manufacturers have equipped the exhaust systems of their vehicles with catalytic converters. Said converters contain catalysts which are poisoned by tetraethyl lead. Since tetraethyl lead has been widely used to boost the octane number of gasoline, refiners now have to turn to alternate means to improve gasoline octane number.

Many methods of octane improvement, however, reduce the yield of gasoline. With the present short supply of available crude oil and the concomitant high demand for unleaded gasoline with a sufficiently high octane number, refiners are faced with a severe dilemma. Unfortunately, these trends are likely to continue in the foreseeable future.

One method of increasing octane number is to raise the cracker reactor temperature. This method, however, is very limited, since many units are now operating at maximum temperatures due to metallurgical limitations. Raising the cracker reactor temperature also results in increased requirements for the gas plant (i.e. gas compressor and separator). Since most gas plants are now operating at maximum capacity, any increased load could not be tolerated by the present equipment.

As can well be appreciated from the foregoing, it would be extremely desirable to have a process which will provide high octane unleaded gasoline without undue sacrifice of gasoline yield. It would be even more desirable if such results could be obtained in conjunction with an increase in operational flexibility and without undue use of expensive catalysts.

SUMMARY OF THE INVENTION

In accordance with the present invention, there has now been discovered an improved process to upgrade the octane number and total yield in catalytic cracking units. By the addition of a very small amount of additive catalyst to conventional cracking catalysts, there is a significant improvement in the octane number of the resultant gasoline, while increasing the total yield comprised of $C_5^+$ gasoline and alkylate.

Whereas before it was believed that up to about 10 weight percent additive catalyst was required to boost octane number, it has now been discovered that only a miniscule amount of said additive catalyst will bring forth similar beneficial results. The totally unexpected discovery of this invention will be of great significance in the field of petroleum refining.

The improved process of this invention affords the refiner great flexibility in catalytic cracking operation, since only a very small quantity of additive catalyst can quickly boost the octane number of the product. The need for only very small quantities of said additive catalyst will also result in great savings in catalyst usage and would thus result in more economic refinery operations.

The additive catalyst of this invention comprises a class of zeolites which are characterized by a silica to alumina mole ratio of at least 12 and a constraint index, as hereinafter described, of about 1 to 12. The additive catalyst can be introduced to the cracking process at any time and at any point for quick octane improvement. The zeolite component of the additive catalyst ranges from about 0.01 weight percent to about 1.0 weight percent of the conventional cracking catalyst in the cracking process.

BRIEF DESCRIPTION OF THE DRAWINGS

FIG. 1. Schematic of a catalyst section for a fluid catalytic cracking plant.

FIG. 2. Section view of the regenerator of said catalyst section.

DESCRIPTION OF THE PREFERRED EMBODIMENTS

Addition of a separate additive catalyst comprising one or more members of a class of zeolites, as defined hereinafter, is extremely effective as an octane and total yield improver in very small amounts when used in conjunction with a conventional cracking catalyst. It has been found that only about 0.1 to 0.5 wt.% of this class of zeolites added to the conventional cracking catalyst in the unit under conventional cracking operations can increase octane by about 1 to 3 RON+0 (research octane number without lead). Octane increase can be varied with the content of the additive catalyst. If excess alkylation capacity is available, $C_5^+$ gasoline plus alkylate yields are higher when the additive catalyst is utilized as compared to conventional commercial cracking catalysts, without sacrificing the octane increase.

Since the zeolites of the additive catalyst are very active catalytically in the fresh state, only very small quantities are necessary to obtain substantial octane improvement in a commercial cracking unit. Thus the refiner is afforded great flexibility in commercial cracking operation, since the additive catalyst can be quickly introduced, because such a small quantity is required as compared to the total inventory of catalyst. The refiner can efficiently control the magnitude of octane increase by controlling the rate of additive catalyst. This type of flexibility could be useful in situations where feed composition or rate changes occur, when demand for high octane gasoline (unleaded) fluctuates, or when capacity for alkylation varies due to mechanical problems or changes in overall refinery operation.

It is clear from the foregoing that octane gain can be controlled to the extent desired by the introduction of only very small amounts of additive catalyst. In commercial practice, the octane gain could be maximized or controlled to operate at maximum light gas handling capability or full alkylation capacity.

The particular proportion of the additive catalyst introduced to the conventional cracking catalyst is important in that such a very small amount of additive catalyst is required to produce substantial octane gains. The weight percent of the zeolite constituent of the additive catalyst required in relation to the total quantity of conventional cracking catalyst in the unit can range between about 0.01 and about 1.0 and preferably from between about 0.05 and about 0.5. The exact weight percent will vary from cracking unit to cracking unit depending on the desired octane number, total gasoline yield required, the available feedstock and the content of active component in the conventional cracking catalyst.

An alternate method to express the required amount of additive catalyst is the weight ratio of the zeolite content of the additive catalyst to the active component content, e.g. zeolite or silica-alumina content, of the conventional cracking catalyst. If expressed in this form, the amount of zeolite in the additive catalyst to the equivalent amount of active component, e.g. zeolite or silica-alumina, in the conventional cracking catalyst measured based upon when it was in fresh state is in the range of between about 1:10,000 to about 1:100 and preferably from between about 1:5,000 to about 1:300.

The additive catalyst can be injected at any time during the catalytic cracking process. The additive catalyst can be introduced while the cracking unit is down, or while the cracking unit is on stream operation. Once the additive catalyst is added to the cracking process, the refiner can return to conventional operation or an operation at lower octane number by eliminating or decreasing the use of additive catalyst. Thus the increase in octane number over the number obtainable under conventional cracking operations can be controlled by controlling the amount of additive catalyst.

Catalytic cracking units which are amenable to the process of this invention operate within the temperature range of about 400° F. to 1300° F. and under reduced atmospheric or superatmospheric pressure. The catalytic cracking process may be operated batchwise or continuously. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

Although the design and construction of individual plants vary, the essential elements of an FCC unit, particularly the flow of catalyst, are illustrated by FIGS. 1 and 2 which show a conventional catalyst section of a fluid catalytic cracking plant.

FIG. 1 and the sectional element thereof shown in FIG. 2 are representative of the catalyst section of a commercial fluid catalytic cracking unit. Referring now to FIG. 1, a hydrocarbon feed 2 such as gas oil boiling from about 600° F. up to 1000° F. is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F. but more usually at least 1000° F. is thus formed in the lower portion of riser 4 for flow upwardly therethrough under hydrocarbon conversion conditions. The suspension initially formed in the riser may be retained during flow through the riser for a hydrocarbon residence time in the range of 1 to 10 seconds.

The hydrocarbon vapor-catalyst suspension formed in the riser reactor is passed upwardly through riser 4 under hydrocarbon conversion conditions of at least 900° F. and more usually at least 1000° F. before discharge into one or more cyclonic separation zones about the riser discharge, represented by cyclone separator 14. There may be a plurality of such cyclone separator combinations comprising first and second cyclonic separation means attached to or spaced apart from the riser discharge for separating catalyst particle from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as a downwardly moving fluid bed of catalyst countercurrent to rising gasiform material. The catalyst passes downwardly through a stripping zone 24 immediately therebelow and countercurrent to rising stripping gas introduced to a lower portion thereof by conduit 26. Baffles 28 are provided in the stripping zone to improve the stripping operation.

The catalyst is maintained in stripping zone 24 for a period of time sufficient to effect a high temperature desorption of feed deposited compounds which are then carried overhead by the stripping gas. The stripping gas with desorbed hydrocarbons passes through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in coked catalyst conduit 36.

This type of catalyst regeneration operation is referred to a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment.

As shown in FIG. 2, the catalyst tangentially introduced to the regenerator by conduit 36 causes the catalyst to circulate in a clockwise direction in this specific embodiment. As the bed of catalyst continues its circular motion, some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration gas introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst thereabove. However, as the regeneration gas velocity conditions are increased, there is less of a demarcation line and the suspended catalyst passes through regions of catalyst particle density generally less than about 30 lbs. per cu. ft. A lower catalyst bed density of at least 20 lbs. per cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating means of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced thereabove. The cyclone combinations diagrammatically represented in FIG. 1 are intended to correspond to that represented in FIG. 2. Catalyst particles separated from the flue gases passing through the cyclones are returned to the mass of catalyst therebelow by the plurality of provided catalyst diplegs.

As mentioned above, regenerated catalyst withdrawn by funnel 40 is conveyed by standpipe 6 to the hydrocarbon conversion riser 4.

It will be clear from FIG. 1 that the term "circulating inventory of catalyst" referred to herein includes the catalyst in riser 4, in the dense bed 22, in the dense bed in stripper 24, and in the dense bed in the regenerator 44 as well as the catalyst material in lines 36 and 6 and the catalyst material suspended in dilute phase and cyclones in the reactor section and the regenerator section. This circulating inventory is everywhere very hot, substantially above about 600° F., since the regenerator operates at a temperature higher than about 1000° F., usually in the range of about 1050° F. to about 1250° F., and the reactor at higher than 800° F.

In actual operation, because the catalytic activity of the circulating inventory of catalyst tends to decrease with age, fresh makeup catalyst usually amounting to about 1 or 2% of the circulating inventory is added per day to maintain optimal catalyst activity, with daily withdrawal plus losses of about like amount of aged circulating inventory. This catalyst makeup is usually added via a hopper (fresh catalyst storage hopper) and conduit (not shown) into the regenerator.

It is a feature of the present invention that the additive catalyst may be introduced in an FCC process without disrupting the operation of the process. The additive catalyst may be introduced into the FCC process as shown in FIG. 1 at almost any convenient point. Preferred points of injection are into the regenerated catalyst transfer conduit 6, or into the catalyst bed 22, or into the stripping zone 24, or into the spent catalyst transfer conduit 36, or into the regenerator zone 42, or more particularly in the regenerator zone in the dense bed of suspended catalyst particles 4. The additive catalyst may also be injected into the hot catalyst storage hopper or mixed with fresh catalyst in the fresh catalyst storage hopper, or other vessel before addition to the unit. Neither of these hoppers is shown in FIG. 1.

The amount of additive catalyst required to increase gasoline octane number is generally based on the total quantity of conventional cracking catalyst in the unit, i.e. on the circulating inventory of conventional cracking catalyst. For example, if the additive catalyst is first introduced via the addition of fresh makeup catalyst, the amount of zeolite constituent in the additive catalyst required would be quite high if compared against the amount of fresh makeup catalyst added. However, after a period of time of fresh makeup catalyst addition, and once the amount of zeolite in the additive catalyst is maintained at the prescribed limits as compared to the circulating inventory of conventional cracking catalyst, the amount of said zeolite in the fresh makeup catalyst addition will be much lower than initially.

A recent advance in the art of catalytic cracking is disclosed in U.S. Pat. No. 4,072,600, the entire contents of which are incorporated herein by reference. One embodiment of this aforesaid patent teaches that trace amouonts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the conventional cracking catalyst can vary from between about 0.01 ppm and about 100 ppm based on total catalyst inventory. The aforesaid metals can also be introduced into the process via the additive catalyst in amounts between about 1.0 ppm and about 1000 ppm based on total additive catalyst.

After cracking, the resulting product gas is compressed and the resulting products may suitably be separated from the remaining components by conventional means such as adsorption, distillation, etc.

Hydrocarbon charge stocks undergoing cracking in accordance with this invention comprise hydrocarbons generally and, in particular, petroleum fractions having an initial boiling point range of at least 400° F., a 50% point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The members of the class of zeolites of the additive catalyst of this invention are characterized by a pore dimension greater than about 5 Angstroms, i.e., it is capable of sorbing paraffins having a single methyl branch as well as normal paraffins, and it has a silica to alumina mole ratio of at least 12. Zeolite A, for example, with a silica to alumina ratio of 2.0, is not useful in this invention, and moreover it has no pore dimension greater than about 5 Angstroms.

The members of the class of zeolites of the additive catalyst constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

The additive catalysts referred to herein utilize members of a class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful in the additive catalysts of this invention possess, in combination: a Constraint Index, as hereinafter defined, of about 1 to 12, a silica to alumina mole ratio of at least about 12, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and the exclude aluminum in the binder or in cationic or other form within the channels.

Although additive catalysts comprising zeolites with a silica to alumina mole ratio of at least about 12 are useful, it is preferred to use zeolites having higher ratios of at least about 30. In some zeolites, the upper limit of silica to alumina mole ratio is unbounded, with values of 30,000 and greater, extending at least theoretically up to infinity. Therefore, the silica to alumina mole ratio of the zeolite component of the additive catalyst for use herein may be from about 12 to infinity, preferably from about 30 to infinity. Such zeolites, after activation, acquire an intracrystalline sorption capacity for normal hexane which is greater than that for water, i.e., they exhibit "hydrophobic" properties. It is believed that this hydrophobic character is advantageous in the present invention.

The zeolites comprising the additive catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Additive catalysts with zeolites with windows of 10-member rings are preferred, although excessive puckering or pore blockage may render these zeolites substantially ineffective.

Additive catalysts comprising zeolites with windows of 12-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constraint access, a simple determination of the "Constraint Index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those which employ a zeolite having a constraint index from 1.0 to 12.0. Constraint Index (C.I.) values for some typical zeolites, including some not within the scope of this invention, are:

| Zeolite | C.I. |
| --- | --- |
| Erionite | 38 |
| ZSM-5 | 8.3 |
| ZSM-11 | 8.7 |
| ZSM-35 | 6.0 |
| TMA Offretite | 3.7 |
| ZSM-38 | 2.0 |
| ZSM-12 | 2 |
| Beta | 0.6 |
| ZSM-4 | 0.5 |
| Acid Mordenite | 0.5 |
| REY | 0.4 |
| Amorphous Silica-Alumina | 0.6 |
| ZSM-23 | 9.1 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above-defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a constraint index of 1 to 12 is intended to be included in the instant catalyst definition regardless that the same identical zeolite tested under other defined conditions may give a constraint index value outside of 1 to 12.

The members of the class of zeolites defined herein of the additive catalyst are exemplified by ZSM-5, ZSM-11, ZSM-12, ZSM-23, ZSM-35, ZSM-38 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5, is incorporated herein by reference as is U.S. Pat. No. 4,061,724 describing a high silica ZSM-5 referred to as "silicalite" in such patent.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

Natural zeolites may sometimes be converted to this class of zeolites by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred zeolites of the additive catalyst are ZSM-5, ZSM-11, ZSM-12, ZSM-23, ZSM-35 and ZSM-38, with ZSM-5 particularly preferred.

The zeolites used in additive catalysts in this invention may be in the hydrogen form or they may be base exchanged or impregnated to contain a rare earth cation complement. Such rare earth cations comprise Sm, Nd, Pr, Ce and La. It is desirable to calcine the zeolite after base exchange.

In a preferred aspect of this invention, the zeolites comprising the additive catalysts herein are selected as those having a crystal framework density, in the dry hydrogen form, of not substantially below about 1.6 grams per cubic centimeter. It has been found that zeolites which satisfy all three of these criteria are most desired. Therefore, the preferred additive catalysts of this invention are those comprising a zeolite having a constraint index as defined above of about 1 to 12, a silica to alumina mole ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on *Zeolite Structure* by W. M. Meier. This paper is included in *Proceedings of the Conference on Molecular Sieves, London, April 1967*, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The additive catalysts of this invention may be prepared in various ways. The additive catalyst may be separately prepared in the form of particles such as pellets or extrudates, for example, and simply mixed in the required proportions. The particle size of the individual component particles may be quite small, for example from about 20 to about 150 microns, when intended for use in fluid bed operation, or they may be as large as up to about ½ inch for fixed bed operation. Or the components may be mixed as powders and formed into pellets or extrudate, each pellet containing both components in substantially the required proportions.

As is the case of many catalysts, it is desirable to incorporate the zeolite component of the additive catalyst in a matrix. Such matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, zeolite materials have been incorporated into naturally occurring clays, e.g. bentonite and kaolin.

In addition to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

Conventional cracking catalysts contain active components which may be zeolitic or non-zeolitic. The non-zeolitic active components are generally amorphous silica-alumina and crystalline silica-alumina. However, the major conventional cracking catalysts presently in use generally comprise a crystalline zeolite (active component) in a suitable matrix. Representative crystalline zeolite active component constituents of conventional cracking catalysts include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being accorded zeolite Y.

The crystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Where a matrix is used, content of catalytically active component, e.g. crystalline zeolite, i.e. the amount of the zeolite Y component, in the conventional cracking catalyst, is generally at least about 5 weight percent, and more particularly between about 5 and about 50 weight percent. Ion exchange of the zeolite to replace its initial alkali metal content can be accomplished either prior to or subsequent to incorporation of the zeolite into the matrix.

Where no matrix as such is used, such as where a non-zeolitic cracking catalyst, e.g. silica-alumina, is used, content of catalytically active component will, of course, approach 100 weight percent. Also, since silica-alumina may serve as a matrix material for catalytically active zeolite component, 100 weight percent catalytically active catalyst may exist.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

The following examles will serve to illustrate the invention.

EXAMPLE 1

Super D, a commercially available FCC catalyst manufactured by the Davison Division of W. R. Grace, which consists of 17 wt.% RENaY in a clay-silica matrix, was steamed for 4 hours at 1400° F., O psig with 100% steam in a fluidized bed in order to simulate the deactivation of cracking catalysts occurring in commercial operation.

EXAMPLE 2

The additive catalyst containing ZSM-5 was prepared by spray drying 25 wt.% ZSM-5 (low sodium type, commercially manufactured) in a semisynthetic matrix containing 69.75 wt.% silica, 5.25 wt.% $Al_2O_3$ and 25 wt.% kaolin clay. The ZSM-5 employed had a silica to alumina ratio of 63.4, a sodium content of 0.02 weight percent, a nitrogen content of 1.41 weight percent and a carbon content of 5.25 weight percent. The spray dried catalyst was column exchanged with a 5% aqueous ammonium sulfate solution and then water washed substantially free of sulfate. The washed product was then further exchanged with a 1% aqueous solution of rare earth chloride, water washed substantially free of chloride and dried at 250° F. for at least 16 hours. The catalyst was analyzed chemically and found to contain (dry basis) 85.2% $SiO_2$, 14.2% $Al_2O_3$, 0.01% Na, 0.45% $RE_2O_3$. The dried catalyst was then calcined at 1200° F., 0.5 hour with $N_2$ in a fluidized bed.

EXAMPLE 3

This example will illustrate the catalytic cracking of a gas oil with a conventional catalytic cracking catalyst. There is no additive catalyst used in this example. Thus, this example is not meant to be representative of the present invention, but will serve as a comparative example.

The catalyst of Example 1 was contacted with Joliet Sour Heavy Gas Oil (JSHGO, properties given in Table 1) in a fixed-fluidized bed bench unit at 945° F.; 20 WHSV, $Hr^{-1}$; and 3 cat/oil. The results of this example are given in the following Table 2.

TABLE 1

| Chargestock | Joliet Sour Heavy Gas Oil (JSHGO) |
|---|---|
| Gravity, °API | 24.3 |
| Aniline Pt., °F. | 171 |
| Sulfur, wt. % | 1.87 |
| Nitrogen, wt. % | 0.10 |
| Basic Nitrogen, ppm | 327 |
| Conradson Carbon, wt. % | 0.28 |
| Viscosity, KV at 210° F. | 3.6 |
| Bromine No. | 4.2 |
| R.I. at 70° F. | 1.5080 |
| Hydrogen, wt. % | 12.3 |

TABLE 1-continued

| Chargestock | Joliet Sour Heavy Gas Oil (JSHGO) |
|---|---|
| Molecular Weight | 358 |
| Pour Point, °F. | 85 |
| Paraffins, wt. % | 23.5 |
| Naphthenes, wt. % | 32.0 |
| Aromatics, wt. % | 44.5 |
| $C_4$, wt. % | 18.9 |

TABLE 2

| Conversion, vol. % | 72.8 |
|---|---|
| $C_5$ + Gasoline, vol. % | 55.7 |
| Total $C_4$'s, vol. % | 17.0 |
| Dry Gas, wt. % | 8.9 |
| Coke, wt. % | 4.2 |
| $H_2$, wt. % | 0.06 |
| $C_5$ + Gasoline + Alkylate, vol. % | 78.5 |
| RON + O, $C_5$ + Gasoline | 89.2 |
| RON + O, $C_5$ + Gasoline + Alkylate | 90.5 |
| n-$C_4$, vol. % | 1.9 |
| i-$C_4$, vol. % | 8.6 |
| $C_4=$, vol. % | 6.4 |
| $C_3$, vol. % | 3.4 |
| $C_3=$, vol. % | 7.3 |
| $C_2$, wt. % | 0.6 |
| $C_2=$, wt. % | 0.7 |

EXAMPLE 4

This example will serve to illustrate the beneficial effects of the additive catalyst of this invention in conventional catalytic cracking processes.

The additive catalyst used in this example, as prepared by the general procedure of Example 2, was added to the commercial (conventional) cracking catalyst, as prepared in accordance with the general procedure of Example 1. The amount of additive catalyst, containing 25 wt.% ZSM-5, introduced was equivalent to that amount required for the quantity of ZSM-5 to equal 0.1 wt.% of the Super D commercial cracking catalyst.

The additive catalyst and commercial cracking catalyst, in the proportions specified above, were contacted with Joliet Sour Heavy Gas Oil (JSHGO), properties given in Table 1) in a fixed fluidized bed bench unit at 945° F.; 20 WHSV, hr$^{-12}$; and 3 cat/oil. The results of this example are given in the following Table 3.

TABLE 3

| Conversion, vol. % | 72.7 |
|---|---|
| $C_5$ + Gasoline, vol. % | 53.7 |
| Total $C_4$'s, vol. % | 18.7 |
| Dry Gas, wt. % | 9.3 |
| Coke, wt. % | 4.2 |
| $H_2$, wt. % | 0.06 |
| $C_5$ + Gasoline + Alkylate, vol. % | 79.0 |
| RON + O, $C_5$ + Gasoline | 90.1 |
| RON + O, $C_5$ + Gasoline + Alkylate | 91.3 |
| n-$C_4$, vol. % | 1.7 |
| i-$C_4$, vol. % | 9.9 |
| $C_4=$, vol. % | 7.1 |
| $C_3$, vol. % | 3.6 |
| $C_3=$, vol. % | 8.1 |
| $C_2$, wt. % | 0.5 |
| $C_2=$, wt. % | 0.7 |

EXAMPLE 5

The procedure of Example 4 was repeated with the exception that enough additive catalyst was added so that the quantity of ZSM-5 was equal to 0.25 wt.% of the Super D commercial catalyst. Evaluation of the above catalyst composite for the catalytic cracking of gas oil is shown in the following Table 4.

TABLE 4

| Conversion, vol. % | 72.8 |
|---|---|
| $C_5$ + Gasoline, vol. % | 50.8 |
| Total $C_4$'s, vol. % | 19.7 |
| Dry Gas, wt. % | 11.0 |
| Coke, wt. % | 4.4 |
| $H_2$, wt. % | 0.07 |
| $C_5$ + Gasoline + Alkylate, vol. % | 80.9 |
| RON + O, $C_5$ + Gasoline | 91.2 |
| RON + O, $C_5$ + Gasoline + Alkylate | 92.1 |
| n-$C_4$, vol. % | 1.8 |
| i-$C_4$, vol. % | 10.1 |
| $C_4=$, vol. % | 7.7 |
| $C_3$, vol. % | 4.0 |
| $C_3=$, vol. % | 10.4 |
| $C_2$, wt. % | 0.6 |
| $C_2=$, wt. % | 0.7 |

EXAMPLE 6

The procedure of Example 4 was repeated with the exception that sufficient additive catalyst was used so that the quantity of ZSM-5 was equal to 0.5 wt.% of the Super D commercial catalyst. Evaluation of the above catalyst composite for the catalytic cracking of gas oil is given in the following Table 5.

TABLE 5

| Conversion, vol. % | 72.3 |
|---|---|
| $C_5$ + Gasoline, vol. % | 47.8 |
| Total $C_4$'s, vol. % | 20.8 |
| Dry Gas, wt. % | 12.1 |
| Coke, wt. % | 4.5 |
| $H_2$, wt. % | 0.06 |
| $C_5$ + Gasoline + Alkylate, vol. % | 80.3 |
| RON + O, $C_5$ + Gasoline | 91.9 |
| RON + O, $C_5$ + Gasoline + Alkylate | 92.6 |
| n-$C_4$, vol. % | 1.6 |
| i-$C_4$, vol. % | 11.5 |
| $C_4=$, vol. % | 7.7 |
| $C_3$, vol. % | 4.4 |
| $C_3=$, vol. % | 11.9 |
| $C_2$, wt. % | 0.6 |
| $C_2=$, wt. % | 0.7 |

TABLE 6

| Example | Wt. % ZSM-5 in Commercial Cracking Catalyst | $\Delta C_5$ + Gasoline RON + O gain (a) / $\Delta C_5$ + Gasoline loss |
|---|---|---|
| 4 | 0.10 | 0.45 |
| 5 | 0.25 | 0.41 |
| 6 | 0.50 | 0.34 |

(a) Compared to base catalyst (Example 3)

The results of Examples 3 to 6 as shown in Tables 2 to 6 clearly indicate the outstanding efficacy of the catalytic cracking process of this invention. The effect of ZSM-5, as evidenced by the catalytic data in Tables 2 to 5, is to improve gasoline octane by recracking low octane gasoline components to $C_3$ and $C_4$ compounds and a small amount of coke. Octane increase, at least initially, is about 1 RON+O for each 2 vol.% $C_5$+ gasoline loss.

As shown in Table 6, an efficiency expressed as the ratio of the increase in $C_5$+ gasoline octane to $C_5$+ gasoline yield loss decreases with increasing amounts of ZSM-5. The exact amount of ZSM-5 necessary to obtain maximum efficiency may vary with unit design, operating variables and especially feedstock variations.

When potential alkylate yield is included in the gasoline analysis, total gasoline yield increases for all the amounts of ZSM-5 additive catalysts by 0.5 to 2.5 volume percent compared with the base catalyst, while still maintaining a 1 to 2 RON+O advantage.

What is claimed is:

1. A process for catalytically cracking a hydrocarbonaceous feedstock comprising the step of contacting the feedstock in a reaction zone under catalytic cracking conditions in the absence of added hydrogen with a catalyst composition comprising a zeolite component having a Constraint Index of about 1 to 12 and a mole ratio of oxides of $SiO_2:Al_2O_3$ greater than about 500 and a large pore size crystalline aluminosilicate cracking component wherein the percent of said crystalline zeolite component to said large pore size crystalline aluminosilicate containing catalyst composition is about 0.05 to 1.0 wt. %, and wherein said zeolite component is a separate additive catalyst.

2. The process of claim 1 wherein said zeolite has a sodium content of less than about 0.5 weight percent.

3. The process of claim 1 wherein the mole ratio of oxides $SiO_2:Al_2O_3$ is about 30,000.

4. The process of claim 1 wherein the large pore size crystalline aluminosilicate cracking component is a Y type zeolite.

5. The process of claim 1 wherein the large pore size crystalline aluminosilicate cracking component is an REY zeolite.

6. The process of claim 1 wherein the large pore size crystalline aluminosilicate cracking component is ultrastable Y.

7. The process of claim 1 wherein the catalytic cracking conditions include a temperature of from about 400° F. to 1300° F, a pressure of subatmospheric to superatmospheric, a catalyst-hydrocarbon weight ratio of about 3 and a weight hourly space velocity of about 20.

8. The process of claim 1 wherein the contacting step comprises contacting a single feed in a single stage in the reaction zone.

9. The process of claim 1 wherein the catalyst composition comprises a physical mixture of the two components.

10. The process of claim 1 wherein the large pore size crystalline aluminosilicate and the zeolite component with a Constraint Index of about 1 to 12 are mixed and spray dried to form micro spheroidal particles.

11. The process of claim 10 wherein the weight of said crystalline aluminosilicate cracking component in an inorganic matrix is from 5 to 50 weight percent.

12. The process of claim 1 wherein the weight ratio of said zeolite component to the total weight of large pore size crystalline aluminosilicate and said zeolite component is from about 1:400 to about 1:15.

13. A process for catalytically cracking a hydrocarbonaceous feedstock in a single stage comprising the steps of contacting the feedstock in a reaction zone in the absence of added hydrogen under catalytic riser cracking conditions with a catalyst composition comprising a zeolite component having a mole ratio of oxides $SiO_2:Al_2O_3$ greater than about 500 and having a Constraint Index of about 1 to 12 and a large pore size crystalline aluminosilicate cracking containing component wherein the weight percent of said zeolite to said large pore size crystalline aluminosilicate cracking containing component is from about 0.01 to 1.0 wt. %, and wherein said zeolite component is a separate additive catalyst.

14. The process of claim 13 wherein a single feedstock is contacted in the contacting stage.

15. The process of claim 13 wherein said zeolite has a sodium content of less than about 0.5 weight percent.

16. The process of claim 13 wherein said zeolite has a mole ratio of oxides $SiO_2:Al_2O_3$ of about 30,000.

17. In a process for catalytically cracking a hydrocarbonaceous feedstock comprising the step of contacting the feedstock in a reaction zone under catalytic cracking conditions in the absence of added hydrogen with a catalyst comprising a conventinal cracking catalyst selected from the group of zeolite X, zeolite Y and naturally occurring faujasite in a matrix, the improvement comprising a separate catalyst additive, equal to 0.5 wt % of said conventional catalyst, of ZSM-5 having a $SiO_2:Al_2O_3$ mole ratio of about 30,000.

18. The process of claim 17 wherein said conventional catalyst comprises about 17 weight percent RENaY in a matrix.

19. The process of claim 1 wherein the zeolite component is ZSM-5.

20. The process of claim 4 wherein the zeolite component is ZSM-5.

21. The process of claim 5 wherein the zeolite component is ZSM-5.

22. The process of claim 6 wherein the zeolite component is ZSM-5.

* * * * *